United States Patent
Jackson

(10) Patent No.: US 8,726,959 B2
(45) Date of Patent: May 20, 2014

(54) TIRE SUPPORT

(76) Inventor: Von Jackson, Detroit, MI (US)

(*) Notice: Subject to any disclaimer, the term of this patent is extended or adjusted under 35 U.S.C. 154(b) by 0 days.

(21) Appl. No.: 13/106,351

(22) Filed: May 12, 2011

(65) Prior Publication Data

US 2012/0305157 A1    Dec. 6, 2012

(51) Int. Cl.
*B60C 17/00* (2006.01)
*B60C 17/04* (2006.01)
*B60C 19/00* (2006.01)
*B60C 19/12* (2006.01)

(52) U.S. Cl.
USPC ............ 152/516; 152/518; 152/520; 152/158

(58) Field of Classification Search
USPC .......................... 152/152, 516, 520, 518, 158
IPC ........... B60C 17/00,1/02, 17/047, 17/02, 17/01, B60C 17/06, 17/10, 19/12, 17/04
See application file for complete search history.

(56) References Cited

U.S. PATENT DOCUMENTS

| | | | |
|---|---|---|---|
| 3,610,308 A * | 10/1971 | McDonald | .................... 152/158 |
| 4,157,107 A | 6/1979 | Cataldo | |
| 4,953,291 A | 9/1990 | Markow | |
| 6,276,416 B1 | 8/2001 | Iwamura | |
| 6,557,604 B2 | 5/2003 | Albrecht | |
| 6,637,486 B1 * | 10/2003 | Rolla | ......................... 152/381.6 |
| 6,814,114 B2 | 11/2004 | Bouvier et al. | |
| 7,086,438 B1 * | 8/2006 | Vossberg | ...................... 152/165 |
| 2008/0295938 A1 | 12/2008 | Naito | |

FOREIGN PATENT DOCUMENTS

| | | | | |
|---|---|---|---|---|
| DE | 3635890 A1 | * | 5/1988 | ............... B60C 5/08 |
| JP | 01114503 | * | 5/1989 | ............. B60C 17/06 |
| JP | 2008-168777 A | | 7/2008 | |
| KR | 10-0942137 B1 | | 2/2010 | |

OTHER PUBLICATIONS

Summary: JP01114503A; Nibu, Hikari; (No date).*
Summary: DE 3635890A1; Senger; (No Date).*
International Search Report dated Nov. 12, 2012. International application No. PCT/US2012/037499.

* cited by examiner

*Primary Examiner* — Justin Fischer
*Assistant Examiner* — Kendra Shin
(74) *Attorney, Agent, or Firm* — Gifford, Krass, Sprinkle, Anderson & Citkowski, P.C.

(57) ABSTRACT

Tire support rings mounted within a tubeless tire to prevent the tire from collapsing upon the occurrence of a leak in the tire and to support a vehicle until the leak can be repaired.

6 Claims, 2 Drawing Sheets

TIRE SUPPORT

FIELD OF THE INVENTION

The present invention relates to vehicle tires and more particular to an inner support for a tubeless tire which permits the tire to remain at least partially inflated after it has been punctured.

BACKGROUND OF THE INVENTION

Various structures to provide support for a tubeless tire that has been punctured have been heretofore provided. Such structures have been unduly complicated and therefore unnecessarily expensive.

SUMMARY OF THE INVENTION

The present invention provides such a structure which is simple in construction and therefore relatively inexpensive to provide.

Tubeless pneumatic tires for automobile vehicles will ordinarily be useless to support an automobile or other vehicle if they have become flat by being punctured or by reason of a leak around the rim or through the tire valve. There are kits which include means for sealing a puncture and restoring at least part of the tire pressure, but they have been largely ineffective. The leaks that cause a tire to flatten are often not caused by punctures and when they are, the sealant in such kits may or may not effectively seal the puncture.

The federal government has now mandated that tire pressure monitoring systems (TPMS) be provided on new vehicles. These systems, when working properly, monitor the pressure in the vehicle's tires and indicate when that pressure is low.

The tire support of the present invention is an important adjunct to such systems in those vehicles where TPMS systems have been installed. TPMS systems are of little or no value when deflation is sudden, such as in the case of a puncture or blowout. The tire support of the present invention would enable a driver to get the vehicle safely off the highway and to a place where the tire can be replaced. Further, in the event of a slow leak, while the TPMS system will indicate that the tire is losing air, it still may not be possible to drive the vehicle without the tire support of the present invention any significant distance before the tire is completely deflated.

Further there are still many vehicles on the road that do no include TPMS systems and when tires are changed very often the systems that are in place are disengaged and are no longer operable to indicate low pressure in the tire. In such situations the tire support of the present invention is the sole means of insuring against the problems caused by vehicle flat tires.

The present invention provides an inner support for a pneumatic tire which permits the tire to be used without being inflated for at least long enough for the driver to get to a repair shop. The support is in the form of a pair of spaced rings mounted within a tire and each having a diameter less than the diameter of the tire so that if the tire looses air, the tire can only flatten to a degree permitted by the rings.

BRIEF DESCRIPTION OF THE DRAWINGS

A better understanding of the present invention can be had by reference to the following drawings in which.

DETAILED DESCRIPTION OF THE PREFERRED EMBODIMENTS

Figures 1, 2:
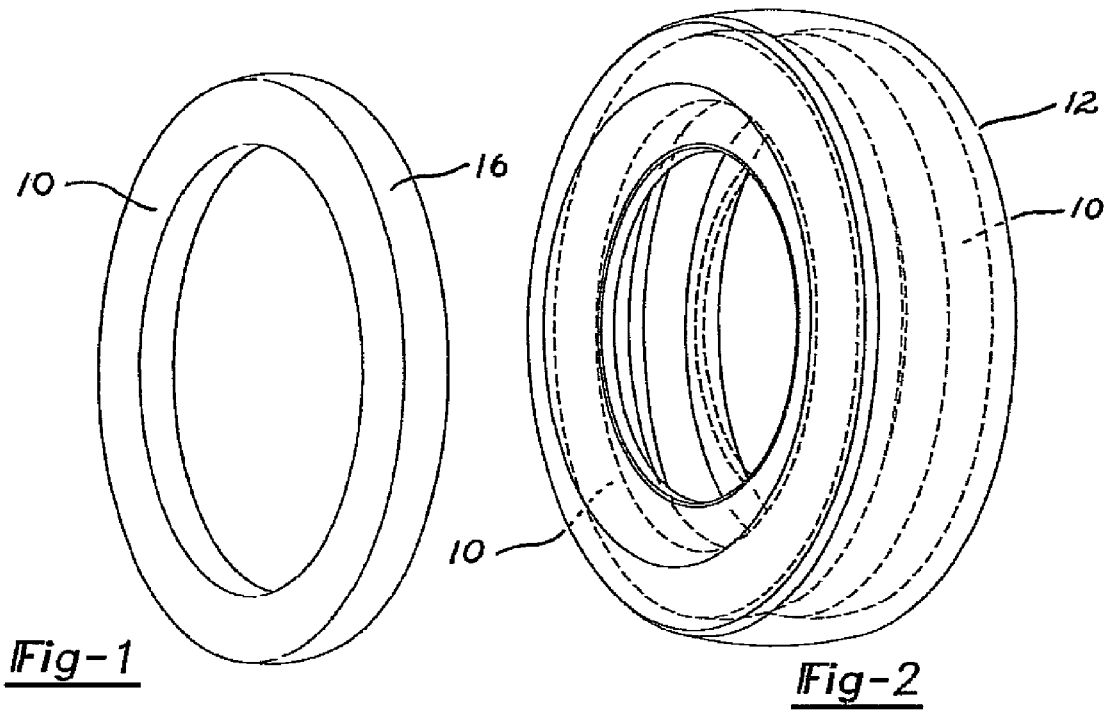
FIG. 1 is a perspective view of a tire support of the present invention.
FIG. 2 is a perspective view of a tubeless tire with tire supports of the present invention shown in phantom inside the tire.
Figures 3, 4:
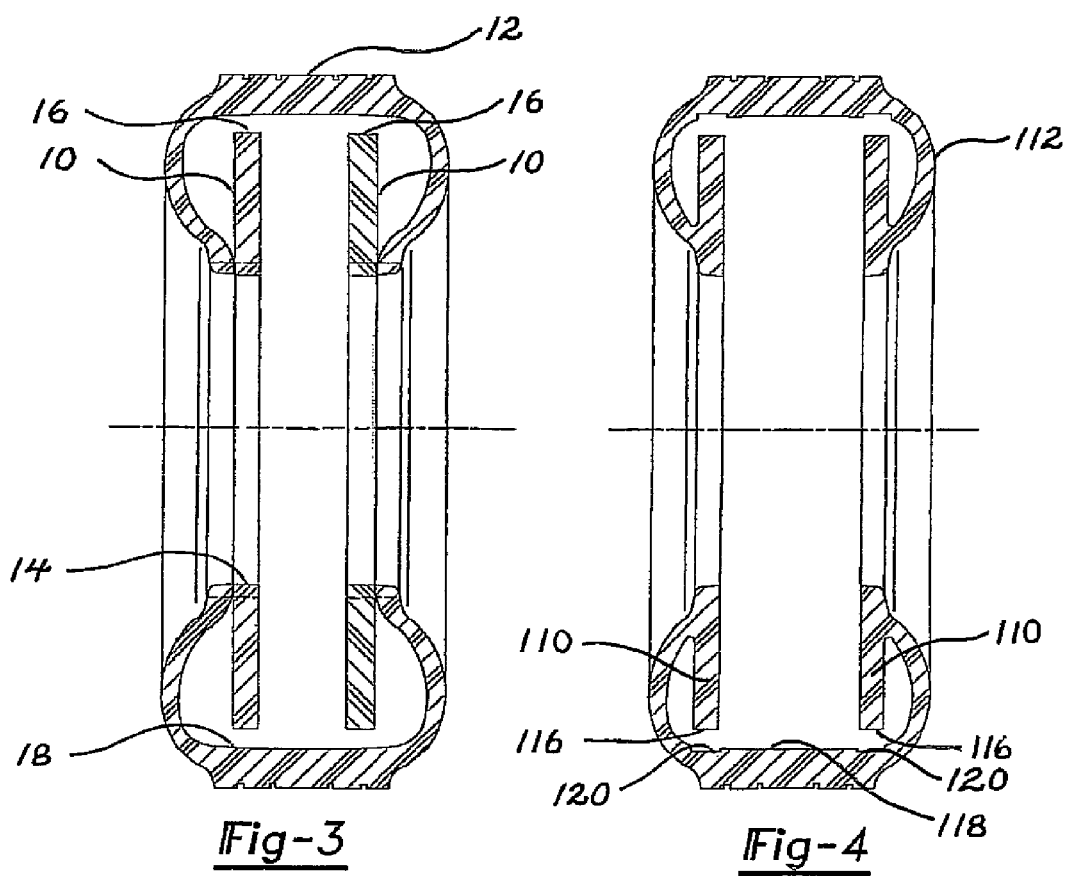
FIG. 3 is a cross-sectional view of a tire with tire supports mounted within the tire.
FIG. 4 is a view similar to FIG. 3, but showing another preferred embodiment of the present invention.

FIGS. 1-3 disclose one preferred embodiment of the present invention as comprising a pair of rings 10 one of which is shown in FIG. 1. The rings 10 are adapted to be inserted in a tubeless tire 12 in a side by side axially spaced position as best seen in FIG. 3.

In the embodiment shown in FIG. 3 the rings 10 are mounted to and engage a wheel rim 14 extending inside the tire 12 which is also mounted to the rim 14.

The rings 10 are preferably constructed of a strong yet resilient material such as hard rubber, the material being sufficiently strong to support the weight of a vehicle and are provided with an outer edge 16 which is radially spaced from the inner surface 18 of the tire 12 when the tire 12 is inflated but which will engage the surface 18 when the tire 12 is deflated due to a puncture or a leak.

With the tire 12 deflated, the rings 10 are capable of supporting a vehicle until the tire leak can be repaired.

Figure 5:
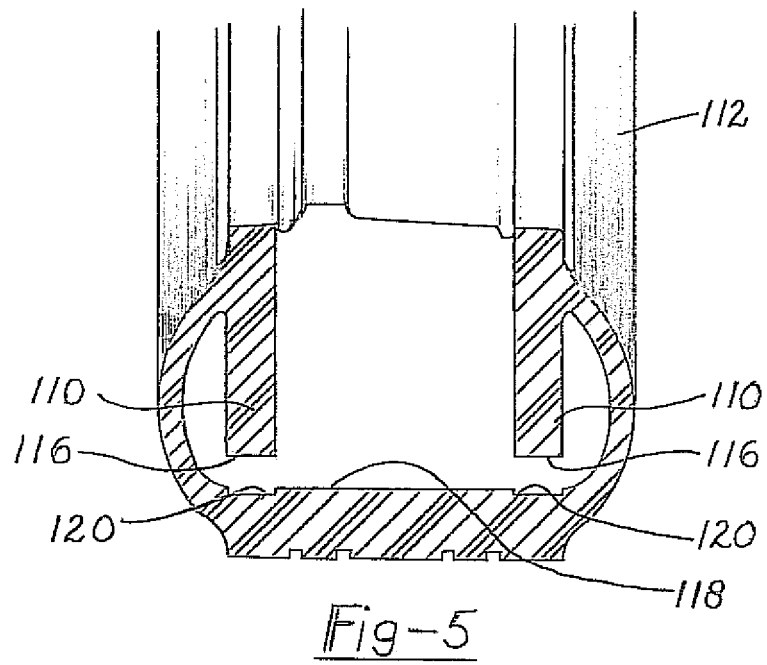
FIG. 5 is an enlarged partial cross-sectional view of the embodiment shown in FIG. 4.
Figure 6:
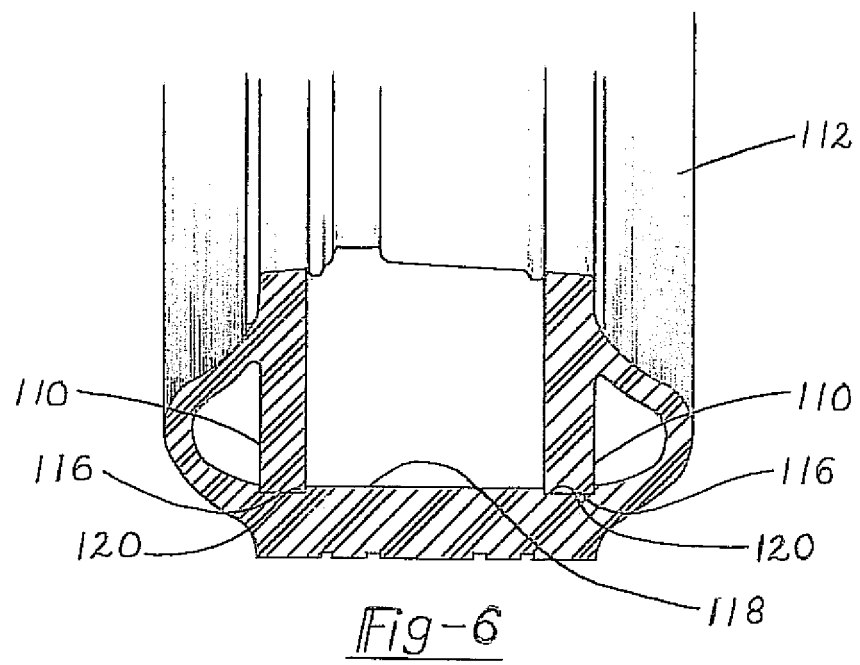
FIG. 6 is a view similar to FIG. 5, but illustrating the tire in a partially flat condition.

FIGS. 4-6 disclose another preferred embodiment of the present invention similar to the embodiment of FIGS. 1-3 but in which the rings 110 are formed as a part of the tire 112. Grooves 120 are provided in the surface 118 to receive the outer edge 116 of the rings 110 when the tire 112 is deflated. This is best seen in FIG. 6.

It is apparent that although several preferred means of providing a run flat tire have been disclosed, changes and modifications can be made without departing from the spirit of the invention as set forth in the following claims.

The invention claimed is:

1. A tire with a safety feature comprising:
 a pneumatic tubeless tire having sidewalls, a tread section including an inner surface, and a tire support;
 the tire support including at least a first and a second ring formed as a unitary part of the tire, each ring being axially spaced from the other ring and formed from material sufficiently strong enough to support a vehicle, each ring having substantially the same width, and each ring also being disposed within said tire and co-axial therewith and having a diameter less than the diameter of said inner surface of the tread section of the tire, and each ring having a fixed diameter, said fixed diameter sufficient to prevent a complete collapse of said sidewall of said tire when said tire is deflated;
 the inner surface of the tread section of the tire having at least a first and a second spaced apart grooves, each groove being aligned with one of said rings and having a floor and opposing sidewalls; and
 each ring having a circumferential edge spaced from the inner surface of said tread section of said tire when said tire is inflated and the circumferential edge of each ring being received within the groove aligned with each ring when said tire is deflated.

2. The tire with a safety feature of claim 1, wherein the pneumatic tubeless tire is a tire for an automobile.

3. A tire with a safety feature comprising:
a pneumatic tubeless tire having sidewalls, a tread section that includes an inner surface, and a tire support;
the tire support including at least a first and a second ring formed as a unitary part of the tire, each ring having the same width, and each ring also being disposed within said interior of the tire and co-axial therewith and having a diameter less than the diameter of said inner surface of the tread section, and each ring having a diameter sufficient to prevent a complete collapse of said sidewall of said tire when said tire is deflated;
the inner surface of the tread section having at least a first and a second groove, each groove being aligned with one of said rings and having a floor and opposing sidewalls; and
each ring having a circumferential edge spaced from the inner surface of said tread section of said tire when said tire is inflated and the circumferential edge of each ring being received within the groove aligned with each ring when said tire is deflated.

4. The tire with a safety feature of claim 3, wherein the pneumatic tubeless tire is a tire for an automobile.

5. A tire with a safety feature comprising:
a pneumatic tubeless tire having sidewalls, a tread section that includes an inner surface, and a tire support;
the tire support including at least a first and a second ring formed as unitary part of the tire and molded with the tire, each ring having identical size and shape, and each ring also being disposed within an interior of the tire and co-axial therewith and having a diameter less than the diameter of said inner surface of the tread section such, and each ring extending towards the inner surface of the tread section in a parallel alignment with respect to each other;
the inner surface of the tread section having at least a first and a second groove spaced apart from each other, each groove being aligned with one of said rings and having a floor and opposing sidewalls sized and shaped to flushly engage at least a portion of the corresponding ring; and
each ring having a circumferential edge spaced from the inner surface of said tread section of said tire when said tire is inflated and the circumferential edge of each ring being received within the groove aligned with each ring when said tire is deflated;
wherein each ring is sized and shaped to prevent a complete collapse of said sidewall of said tire when said tire is deflated and each ring is received within the aligned groove.

6. The tire with a safety feature of claim 5, wherein the pneumatic tubeless tire is a tire for an automobile.

* * * * *